United States Patent
Fujieda et al.

(10) Patent No.: US 8,559,704 B2
(45) Date of Patent: Oct. 15, 2013

(54) THREE-DIMENSIONAL VISION SENSOR

(71) Applicant: Omron Corporation, Kyoto (JP)

(72) Inventors: Shiro Fujieda, Kyoto (JP); Atsushi Taneno, Kyoto (JP); Hiroshi Yano, Toyonaka (JP); Yasuyuki Ikeda, Ikeda (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 13/633,536

(22) Filed: Oct. 2, 2012

(65) Prior Publication Data

US 2013/0033580 A1 Feb. 7, 2013

Related U.S. Application Data

(62) Division of application No. 12/711,028, filed on Feb. 23, 2010, now Pat. No. 8,295,588.

(30) Foreign Application Priority Data

Mar. 12, 2009 (JP) ................................. 2009-059919

(51) Int. Cl.
G06K 9/00 (2006.01)
(52) U.S. Cl.
USPC ........... 382/154; 382/118; 382/173; 382/199; 382/209; 382/217; 382/276; 382/285
(58) Field of Classification Search
CPC ..... G06T 7/0075; G06T 15/00; G06T 7/0022; G06T 17/00; G06K 9/00201
USPC ......... 382/154, 118, 173, 199, 209, 217, 276, 382/285
See application file for complete search history.

(56) References Cited

U.S. PATENT DOCUMENTS 5,864,632 A 1/1999 Ogawa et al.
6,278,798 B1 8/2001 Rao
(Continued)

FOREIGN PATENT DOCUMENTS

JP 10-122819 5/1998
JP 10-160464 A 6/1998
(Continued)

OTHER PUBLICATIONS

Camera Calibration: Calibrating methods for stereo cameras; Sentience: A 3D volumetric perception system for mobile robots; Aug. 20, 2009; retrieved Mar. 10, 2013; <<http://code.google.com/p/sentience/wiki/CameraCalibration>>; 6 pages.

(Continued)

Primary Examiner — Mike Rahmjoo
(74) Attorney, Agent, or Firm — Foley & Lardner LLP

(57) ABSTRACT

Enabling height recognition processing by setting a height of an arbitrary plane to zero for convenience of the recognition processing. A parameter for three-dimensional measurement is calculated and registered through calibration and, thereafter, an image pickup with a stereo camera is performed on a plane desired to be recognized as having a height of zero in actual recognition processing. Three-dimensional measurement using the registered parameter is performed on characteristic patterns (marks m1, m2 and m3) included in this plane. Based on a positional relationship between a plane defined as having a height of zero through the calibration and the plane expressed by the calculation equation, a transformation parameter (a homogeneous transformation matrix) for displacing points in the former plane into the latter plane is determined, and the registered parameter is changed using the transformation parameter.

2 Claims, 13 Drawing Sheets

(56) References Cited

U.S. PATENT DOCUMENTS

| | | | |
|---|---|---|---|
| 6,330,356 | B1 | 12/2001 | Sundareswaran et al. |
| 6,445,815 | B1 | 9/2002 | Sato |
| 6,915,072 | B2 | 7/2005 | Takahashi et al. |
| 7,003,136 | B1 | 2/2006 | Harville |
| 7,231,081 | B2 | 6/2007 | Snow et al. |
| 7,277,599 | B2 | 10/2007 | Eian et al. |
| 7,526,121 | B2 | 4/2009 | Ban et al. |
| 8,126,260 | B2 | 2/2012 | Wallack et al. |
| 8,170,295 | B2 | 5/2012 | Fujii et al. |
| 8,280,151 | B2 | 10/2012 | Fujieda et al. |
| 8,295,588 | B2 | 10/2012 | Fujieda et al. |
| 2002/0187831 | A1 | 12/2002 | Arikawa et al. |
| 2004/0051783 | A1 | 3/2004 | Chellappa et al. |
| 2004/0153671 | A1 | 8/2004 | Schuyler et al. |
| 2004/0247174 | A1 | 12/2004 | Lyons et al. |
| 2005/0084149 | A1 | 4/2005 | Aizawa et al. |
| 2005/0111703 | A1 | 5/2005 | Merbach et al. |
| 2005/0249400 | A1 | 11/2005 | Fukumoto |
| 2005/0249434 | A1 | 11/2005 | Xu et al. |
| 2005/0280645 | A1 | 12/2005 | Nagata et al. |
| 2005/0286767 | A1 | 12/2005 | Hager et al. |
| 2006/0050087 | A1 | 3/2006 | Tanimura et al. |
| 2006/0050952 | A1 | 3/2006 | Blais et al. |
| 2006/0182308 | A1 | 8/2006 | Gerlach et al. |
| 2006/0232583 | A1 | 10/2006 | Petrov et al. |
| 2007/0081714 | A1 | 4/2007 | Wallack et al. |
| 2008/0123937 | A1 | 5/2008 | Arias Estrada et al. |
| 2008/0212887 | A1 | 9/2008 | Gori et al. |
| 2008/0260227 | A1 | 10/2008 | Hayashi et al. |
| 2008/0303814 | A1 | 12/2008 | Ishiyama |
| 2009/0222768 | A1 | 9/2009 | Roe et al. |
| 2009/0309893 | A1 | 12/2009 | Boothroyd et al. |
| 2010/0231690 | A1 | 9/2010 | Fujieda et al. |
| 2010/0231711 | A1 | 9/2010 | Taneno et al. |
| 2010/0232647 | A1 | 9/2010 | Fujieda et al. |
| 2010/0232681 | A1 | 9/2010 | Fujieda et al. |
| 2010/0232682 | A1 | 9/2010 | Fujieda et al. |
| 2010/0232683 | A1 | 9/2010 | Fujieda et al. |
| 2010/0232684 | A1 | 9/2010 | Fujieda et al. |
| 2011/0090317 | A1* | 4/2011 | Su et al. ............ 348/49 |
| 2011/0150280 | A1 | 6/2011 | Tsuji |
| 2011/0218776 | A1 | 9/2011 | Shono et al. |
| 2012/0050525 | A1 | 3/2012 | Rinner et al. |
| 2012/0155786 | A1* | 6/2012 | Zargarpour et al. ......... 382/284 |

FOREIGN PATENT DOCUMENTS

| | | |
|---|---|---|
| JP | 10-269362 A | 10/1998 |
| JP | 2961264 | 8/1999 |
| JP | 2000-094374 A | 4/2000 |
| JP | 2005-017286 A | 1/2005 |
| JP | 2006-250889 A | 9/2006 |
| JP | 2007-064836 A | 3/2007 |
| JP | 2007-249592 | 9/2007 |

OTHER PUBLICATIONS

FIALA, et al.; Fully Automatic Camera Calibration Using Self-identifying Calibration Targets; Nov. 2005; pp. 1-26; National Research Council, Canada.

Japan Patent Office action on application 2009-059919 mailed Mar. 12, 2013; pp. 1-3; with partial English translation.

Japan Patent Office action on application 2009-059921 mailed Mar. 12, 2013; pp. 1-3; with partial English translation.

Japan Patent Office action on application 2009-061355 mailed Oct. 16, 2012; pp. 1-2, with partial English translation.

Japan Patent Office Notice of Grounds of Rejection on application 2009-059923 mailed Dec. 11, 2012; pp. 1-2; with English translation.

Paglieroni, David W.; Short Communication—A Unified Distance Transform Algorithm and Architecture; Machine Vision and Applications (1992) 5:47-55.

Sumi, Yasushi, et al.; Three-Dimensional Object Recognition Using Stereo Vision; May 1997; pp. 1105-1112; Transactions of the Institute of Electronics, Information and Communication Engineers, Japan, vol. J80-D-II, No. 5.

US Non-final Office Action on U.S. Appl. No. 12/711,814 dated Nov. 21, 2012; 16 pages.

USPTO Final Office Action on U.S. Appl. No. 12/710,266 mailed Jan. 29, 2013; 12 pages.

USPTO Final Office Action on U.S. Appl. No. 12/711,976 mailed Dec. 11, 2012; 10 pages.

USPTO Non-final Office Action on U.S. Appl. No. 12/710,266 mailed Oct. 24, 2012; 13 pages.

USPTO Non-final Office Action on U.S. Appl. No. 12/711,018 mailed Dec. 31, 2012; 13 pages.

USPTO Notice of Allowance on U.S. Appl. No. 12/711,814 mailed Mar. 14, 2013; 12 pages.

Kawai, Y. et al., "Stereo Correspondence Using Segment Connectivity", Journal of Information Processing, vol. 40, No. 8, Aug. 1999, pp. 3219-3229.

USPTO Final Office Action on U.S. Appl. No. 12/710,266 dated Jul. 16, 2012; 16 pages.

USPTO Non-final Action on U.S. Appl. No. 12/710,266 dated Feb. 23, 2012; 11 pages.

USPTO Non-final Action on U.S. Appl. No. 12/711,018 dated Jun. 4, 2012; 14 pages.

USPTO Non-final Action on U.S. Appl. No. 12/711,028 dated Mar. 16, 2012; 12 pages.

USPTO Non-final Office Action on U.S. Appl. No. 12/711,976 dated Jun. 26, 2012; 12 pages.

USPTO Notice of Allowance on U.S. Appl. No. 12/711,028 dated Jun. 22, 2012; 11 pages.

USPTO Notice of Allowance on U.S. Appl. No. 12/711,179 dated Jan. 27, 2012; 12 pages.

USPTO Notice of Allowance on U.S. Appl. No. 12/711,179 dated Mar. 15, 2012; 6 pages.

USPTO Notice of Allowance on U.S. Appl. 12/711,196 dated Jun. 13, 2012; 11 pages.

USPTO Office Action on U.S. Appl. No. 12/710,266 dated Feb. 23, 2012; 11 pages.

Zhengyou Zhang, A Flexible New Technique for Camera Calibration, Technical Report MSR-TR-98-71; Dec. 2, 1998, Microsoft Research, Microsoft Corporation, Redmond, WA 98052; pp. 1-21.

USPTO Final Office Action on U.S. Appl. No. 12/711,018 dated Sep. 18, 2012; 13 pages.

Rusinkiewicz, Szymon, et al.; Efficient Variants of the ICP Algorithm; Proc. 3DIM 2001; pp. 1-8.

USPTO Final Office Action on U.S. Appl. No. 12/711,018 mailed Apr. 15, 2013; 17 pages.

USPTO Non-final Action on U.S. Appl. No. 12/711,976 mailed Jun. 5, 2013; 16 pages.

\* cited by examiner

THREE-DIMENSIONAL VISION SENSOR

CROSS-REFERENCE TO RELATED PATENT APPLICATIONS

Japan Priority Application 2009-059919, filed Mar. 12, 2009 including the specification, drawings, claims and abstract, is incorporated herein by reference in its entirety. This application is a Divisional of U.S. application Ser. No. 12/711,028, filed Feb. 23, 2010, incorporated herein by reference in its entirety.

BACKGROUND OF THE INVENTION

1. Technical Field

The present invention relates to a three-dimensional vision sensor for recognizing a target object through three-dimensional measurement processing using a stereo camera.

2. Related Art

In order to perform three-dimensional measurement using a stereo camera, it is necessary to determine a perspective transformation matrix P (refer to the following equations (1) and (2)) in a transformation equation indicative of a relationship between a world coordinate system and a coordinate system of each camera constituting the stereo camera.

(Equation 1)

$$\lambda \begin{bmatrix} x \\ y \\ 1 \end{bmatrix} = P \begin{bmatrix} X \\ Y \\ Z \\ 1 \end{bmatrix} \quad (1)$$

(Equation 2)

$$P = \begin{bmatrix} P_{00} & P_{01} & P_{02} & P_{03} \\ P_{10} & P_{11} & P_{12} & P_{13} \\ P_{20} & P_{21} & P_{22} & P_{23} \end{bmatrix} \quad (2)$$

The respective components $P_{00}, P_{01}, \ldots P_{23}$ in the perspective transformation matrix P reflect internal parameters of the camera (a focal length, a resolution, an image center and the like) and parameters induced by a position and an attitude of the camera (a rotational deviation of the camera coordinate system with respect to the world coordinate system, an amount of positional deviation between origin points in the respective coordinate systems, and the like). Conventional calibration processing has acquired, for each camera, plural sets of two dimensional coordinates (x, y) and three-dimensional coordinates (X, Y, Z) in the coordinate system of the camera, further substitutes each set of coordinates into the equation (1) to define multiple simultaneous equations having the respective components in the matrix P as unknown numerical values. Further, most preferable values of the respective components are specified according to a least square method.

Next, as documents which disclose methods for easily deriving the coordinates for use in the aforementioned calculations, there are Zhengyou Zhang "A Flexible New Technique for Camera Calibration", Microsoft Research Microsoft Corporation, [searched in Feb. 2, 2009], the Internet <URL: http://research.microsoft.com/en-us/um/people/zhang/calib/> and JP-A No. 2006-250889 to which Zhengyou Zhang "A Flexible New Technique for Camera Calibration" is applied. Zhengyou Zhang "A Flexible New Technique for Camera Calibration", Microsoft Research Microsoft Corporation, [searched in Feb. 2, 2009], the Internet <URL: http://research.microsoft.com/en-us/um/people/zhang/calib/> describes performing at least two image pickups on a flat-plate-shaped work provided with a two-dimensional calibration pattern configured by marks arranged at equal intervals while changing the height and the orientation of the work, then extracting characteristic points corresponding to the respective marks from the images created by the respective image pickups and, further, specifying coordinates in the world coordinate system from the relationship among the characteristic points.

Further, JP-A No. 2006-250889 describes performing an image pickup at a state where two transparent sheets provided with different calibration patterns are placed horizontally with a predetermined interval interposed therebetween, in order to enable acquiring a number of characteristic points required for the calibration patterns from the same image, and further setting the Z coordinate (the coordinate indicative of the height) of a plane coincident with the lower transparent sheet to zero, in order to calculate parameters.

SUMMARY

In three-dimensional measurement, three-dimensional coordinates are derived based on a world coordinate system similar to that defined through calibration, but a plane having a height of zero which has been defined through calibration is not always coincident with a supporting surface for recognition-target objects. Further, there may be cases where recognition-target objects are not supported horizontally, depending on jigs for supporting the recognition-target objects.

Further, in cases where a three-dimensional vision sensor is used for, instead of performing measurement of an entire object, performing, on a portion protruding from a predetermined surface, processing for recognizing a degree of this protrusion (for example, inspections of a push button switch or screws in an electronic apparatus), it is more preferable, in view of convenience, to define a plane which functions as a reference for the measurement of the degree of the protrusion as having a height of zero.

Further, if an image of an object existing below a target object is captured along with the target object during recognizing processing, a result of the recognition of this object may be outputted as a noise. Further, in cases where measurement is performed on a model of a target object for creating a three-dimensional model for use in three-dimensional matching processing, similarly, if an image pickup is performed at a state where an object existing below the model falls within the camera, this will involve processing for eliminating noises from the measured three-dimensional coordinates, thereby preventing the creation of the three-dimensional model from being performed efficiently.

In view of the aforementioned problems, it is an object of the present invention to enable performing height recognition processing by setting a height of an arbitrary plane to zero, for convenience of the recognizing processing.

In accordance with one aspect of the present invention, a three-dimensional vision sensor according to the present invention includes a stereo camera; a parameter calculation unit which extracts characteristic points in a calibration work which is designed to extract, therefrom, a plurality of characteristic points having a certain positional relationship thereamong, from a stereo image created through an image pickup on the calibration work by the stereo camera and, further, calculates a parameter for three-dimensional measurement using the characteristic points; a parameter storage unit in which the parameter for three-dimensional measurement is registered; and a three-dimensional recognition unit which performs three-dimensional measurement processing using the parameter registered in the parameter storage unit on a stereo image created through an image pickup on a predetermined recognition-target object by the stereo camera for performing predetermined recognition processing including height recognition on the recognition-target object Further, the three-dimensional vision sensor includes a coordinate acquisition unit which, in response to an image pickup performed on a plane provided with predetermined characteristic patterns by the stereo camera, performs three-dimensional measurement processing for at least three representative points in the characteristic patterns, using a stereo image created by the image pickup and the parameter calculated by the parameter calculation unit, for acquiring the three-dimensional coordinates of the respective representative points, a determination unit which, based on the three-dimensional coordinates of the respective representative points which have been acquired by the coordinate acquisition unit, specifies a calculation equation expressing a plane including these three-dimensional coordinates and determines the positional relationship between the plane expressed by the calculation equation and a plane recognized as having a height of zero through three-dimensional measurement processing using the parameter calculated by the parameter calculation unit, and a correction unit which corrects the parameter registered in the parameter storage unit or the result of the three-dimensional measurement processing using the parameter, based on the positional relationship determined by the determination unit.

With the aforementioned structure, by performing an image pickup on a plane desired to be recognized as a plane with a height of zero such that predetermined characteristic patterns in this plane fall within the fields of view of the respective cameras constituting the stereo camera, after the completion of the calculation and the registration of the parameter for three-dimensional measurement, it is possible to determine the positional relationship between the plane subjected to the image pickup and a plane defined as having a height of zero through calibration and, also, it is possible to recognize heights using the plane subjected to the image pickup as a reference, based on the result of the determination. This enables a user to freely change the plane which functions as a reference for height recognition processing, according to the state where the recognition-target object is supported and according to the purpose of processing. Further, in cases where the plane is oblique with respect to a horizontal direction in an actual space, it is possible to recognize an amount of displacement from this plane, by determining the height with respect to the plane.

In a preferred aspect of the three-dimensional vision sensor, the correction unit corrects the parameter registered in the parameter storage unit using the transformation parameter and replaces the registered parameter with the corrected parameter.

In the aforementioned aspect, the parameter for three-dimensional measurement processing which has been registered through calibration is updated to a parameter which has been corrected using the transformation parameter. This enables efficiently performing height recognition processing through three-dimensional measurement processing using the updated parameter, in processing by the three-dimensional recognition unit.

In another preferred aspect, in the three-dimensional vision sensor, the coordinate acquisition unit extracts at least three areas including respective preliminarily-registered characteristic patterns from a plurality of images constituting the stereo image, further associates the extracted areas with one another among the images, based on the parameter calculated by the parameter calculation unit, and, for each of the areas associated with one another, calculates the three-dimensional coordinates of a single representative point in this area.

In the aforementioned aspect, for example, with a method for attaching seals to a plane desired to function as a reference for height measurement, it is possible to temporarily set characteristic patterns defined in advance on this plane for acquiring three-dimensional coordinates necessary for the specification of a calculation equation expressing this plane.

In still another preferred aspect, in the three-dimensional vision sensor, the coordinate acquisition unit displays one of a plurality of images constituting the stereo image. Further, on receiving an operation for specifying at least three areas including predetermined characteristic patterns on the displayed screen, the coordinate acquisition unit extracts areas corresponding to the specified areas from the respective images other than the displayed image, based on the parameter calculated by the parameter calculation unit. Further, for each set of areas associated with one another through these processing, the coordinate acquisition unit calculates the three-dimensional coordinates of a single representative point of this area.

In the aforementioned aspect, a stereo image pickup is performed on a plane desired as a reference for height recognition processing, in such a way as to capture images of three or more characteristic patterns suitable for extraction of representative points, and the user is caused to specify areas including the respective characteristic patterns in the displayed image. This enables acquiring three-dimensional coordinates necessary for the specification of a calculation equation expressing the plane.

In still another preferred aspect, in the three-dimensional vision sensor, the recognition processing unit eliminates, from the recognition-target objects, the three-dimensional coordinates each indicating a height smaller than 0, out of the three-dimensional coordinates obtained through the measurement processing by the three-dimensional measurement processing.

In the aforementioned aspect, even when an image of an object existing below the plane defined as a reference for height recognition processing is captured along with the recognition-target object, it is possible to prevent the result of the measurement on this object from affecting the result of the recognition processing. This enables stably performing three-dimensional recognition processing.

In yet another preferred aspect, the three-dimensional vision sensor further includes a unit which performs a perspective transformation of the two planes used for deriving the transformation parameter, namely the plane recognized as having a height of zero through three-dimensional measurement processing using the parameter calculated by the parameter calculation unit and the plane expressed by the calculation equation specified by the transformation parameter deriving unit, for creating projected images indicative of the relationship therebetween, and further includes a unit which displays the created projected images on a monitor device.

In the aforementioned aspect, it is possible to easily determine the relationship between the plane defined as having a height of zero through calibration and the plane set as a reference for height recognition processing.

Next, a three-dimensional vision sensor having a different structure according to the present invention includes a stereo camera, a parameter calculation unit and a parameter storage unit similar to those described above and, further, includes a model creation unit which performs three-dimensional measurement processing using the parameter registered in the parameter storage unit on a stereo image created through an image pickup on a predetermined recognition-target object by the stereo camera for creating a three-dimensional model for the recognition-target object using the result of the measurement; a three-dimensional-model storage unit in which the created three-dimensional model is registered; and a three-dimensional recognition unit which performs three-dimensional measurement processing using the parameter registered in the parameter storage unit on a stereo image created by an image pickup for the recognition-target object by the stereo camera and, further, compares the result of the measurement with the three-dimensional model registered in the three-dimensional-model storage unit for recognizing a position and an attitude of the recognition-target object.

Further, the three-dimensional vision sensor also includes a coordinate acquisition unit and a determination unit as described above. Further, the model creation unit corrects the parameter registered in the parameter storage unit based on the positional relationship determined by the determination unit, further performs three-dimensional measurement processing using the corrected parameter, and creates a three-dimensional model using the coordinates each indicating a height of 0 or more, out of the three-dimensional coordinates obtained from the measurement.

With the aforementioned structure, in cases of creating a three-dimensional model using the result of three-dimensional measurement for a model for a recognition-target object, it is possible to create a three-dimensional model after correcting the parameter for three-dimensional measurement in such a way as to enable height measurement by setting the supporting surface for the model as a reference. Further, even when an image of an object existing below the model is captured during an image pickup, the result of the measurement on this object is not reflected on the three-dimensional model. This enables easily creating a three-dimensional model with excellent accuracy.

With the aforementioned three-dimensional vision sensor, it is possible to freely define a plane which functions as a reference for height recognition processing according to the surface for actually supporting the recognition-target object and the purpose of the processing, thereby largely improving the convenience of the three-dimensional vision sensor.

DETAILED DESCRIPTION

Hereinafter, two embodiments will be described, with respect to recognition processing using a three-dimensional vision sensor.

First Embodiment

Figure 1:
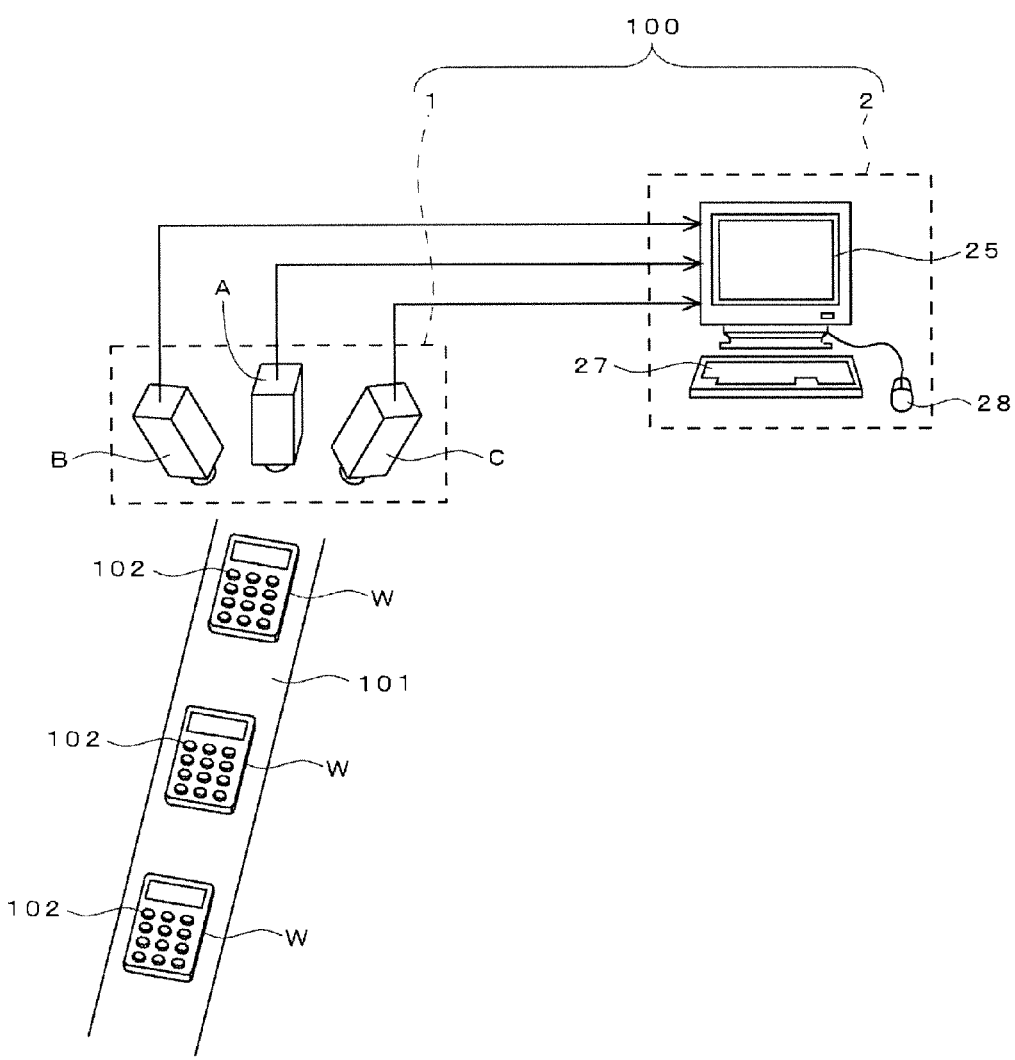
FIG. 1 is a view illustrating a structure of an inspection line which incorporates a three-dimensional vision sensor.

FIG. 1 illustrates an embodiment of an inspection line which employs a three-dimensional vision sensor.

This inspection line is for performing, on works W (remote control apparatuses, specifically) having the same shape which have been produced in a factory, inspections as to whether or not heights of push buttons 102 provided on upper surfaces of their cabinets are proper.

A three-dimensional vision sensor 100 in the present embodiment is configured by a stereo camera 1 provided above a transfer line 101 for works W, and a recognition processing apparatus 2 provided near the transfer line 101. The stereo camera 1 is configured by three cameras A, B and C which are laterally arranged. The center camera A, among them, is placed at a state where its optical axis is oriented in a vertical direction (that is, when viewed at its front surface), while the left and right cameras B and C are placed such that their optical axes are oblique.

The recognition processing apparatus 2 is a computer which stores dedicated programs. The recognition processing apparatus 2 incorporates, therein, images created by the respective cameras A, B and C, further associates the areas of the images which correspond to the respective buttons 102 with one another among the respective images and determines the heights (the Z coordinates) of representative points in the respective buttons 102, based on preliminarily-registered setting information (parameters for three-dimensional measurement, pattern images of characters drawn on the respective buttons 102, and the like). Further, the recognition processing apparatus 2 compares a Z coordinate acquired for each button 102 with a pre-registered reference value to determine whether or not the height of each button 102 is proper. The result of this determination is transmitted to a higher apparatus which is not illustrated.

Figure 2:
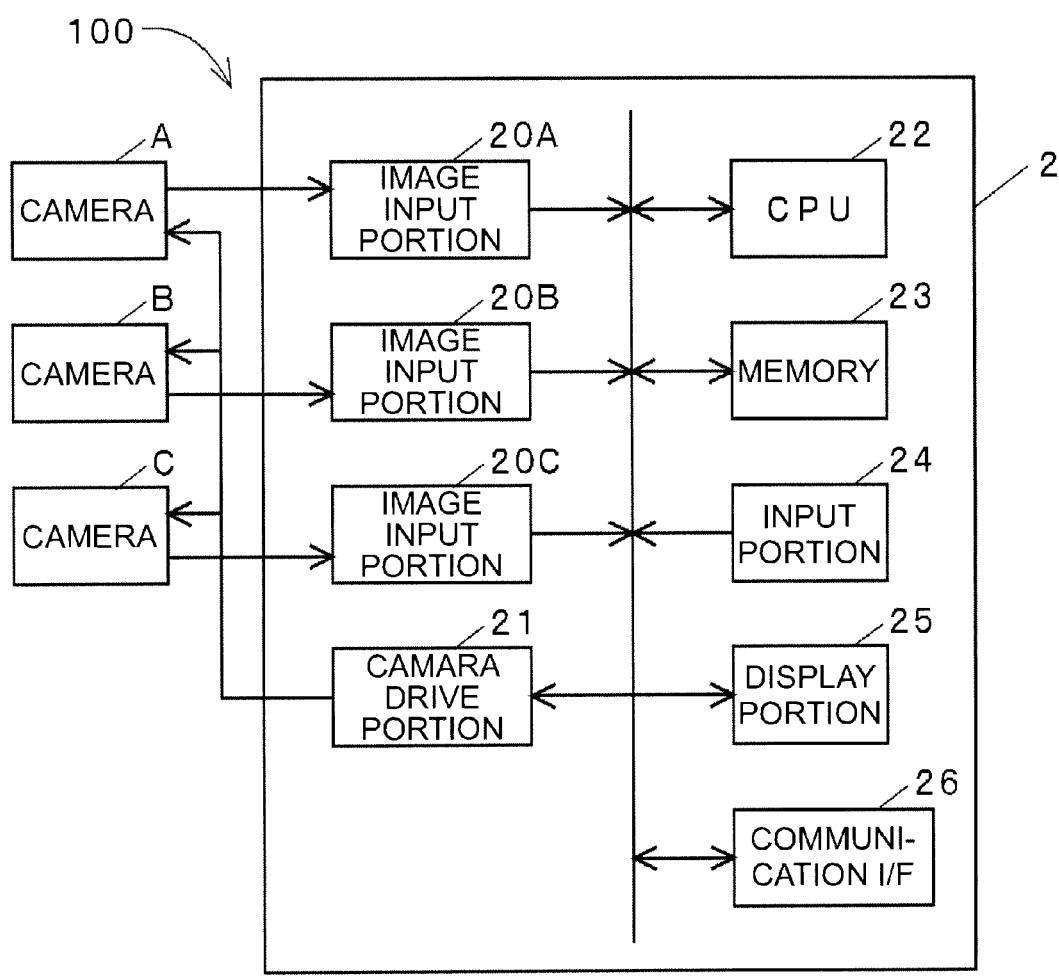
FIG. 2 is a block diagram illustrating an electric structure of the three-dimensional vision sensor.

FIG. 2 illustrates a block diagram of the structure of the three-dimensional vision sensor 100.

Referring to the figure, the recognition processing apparatus 2 includes image input portions 20A, 20B and 20C in association with the respective cameras A, B and C, a camera driving portion 21, a CPU 22, a memory 23, an input portion 24, a display portion 25, a communication interface 26 and the like.

The camera driving portion 21 drives the cameras A, B and C, at the same time, according to commands from the CPU 22. In inspection, the CPU 22 outputs commands for image pickups, according to detection signals inputted from a work detecting sensor (not illustrated) provided at a predetermined position on the transfer line 101. Further, in setting processing before inspections, the CPU 22 outputs a command for image pickup, in response to reception of a command for starting an image pickup from the input portion 24.

The display portion 25 is a monitor device in FIG. 1. Further, the input portion 24 is an integration of a key board 27 and a mouse 28 in FIG. 1. These are used for inputting information for settings and for displaying information for supporting operations, in calibration processing. The communication interface 26 is used for communication with a higher apparatus.

The memory 23 includes a large-capacity memory, such as a ROM, a RAM or a hard disk, and stores programs and setting data for calibration processing, creation of three-dimensional models and three-dimensional recognition processing for works W. Further, parameters and three-dimensional models for three-dimensional measurement that have been calculated in calibration processing are also registered in a dedicated area in the memory 23.

The CPU 22 performs processing for calculations and registration of parameters for three-dimensional measurement, based on programs in the memory 23. This enables three-dimensional measurement for works W. Hereinafter, this calibration processing will be described in detail.

Figure 3:
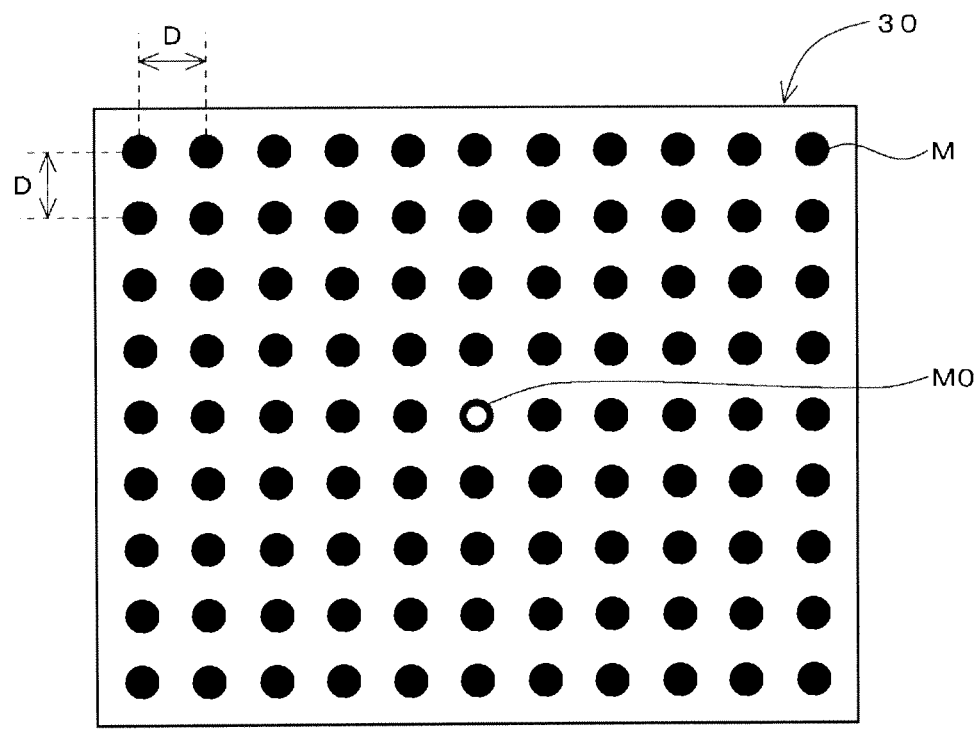
FIG. 3 is a view illustrating an example of the structure of a calibration plate.

In the present embodiment, the parameters for three-dimensional measurement are calculated using a calibration plate 30 as illustrated in FIG. 3. The calibration plate 30 is formed from a thin plate with a white background which is provided with two-dimensional calibration patterns drawn on an upper surface thereof.

The calibration pattern illustrated in FIG. 3 has circular-shaped marks M with the same diameter which are arranged at equal intervals in upward, downward, leftward and rightward directions (in the figure, "D" corresponds to a distance between center points of adjacent marks M). The marks M other than a mark M0 positioned at the center are colored in a single black color, while the center mark M0 is colored in a black color at its outer peripheral portion and also is provided, inside thereof, with a white-colored circle with a slightly smaller size. The positioning of the calibration plate 30 and recognition of characteristic points therein are performed by using the mark M0 as a reference.

Figure 4:
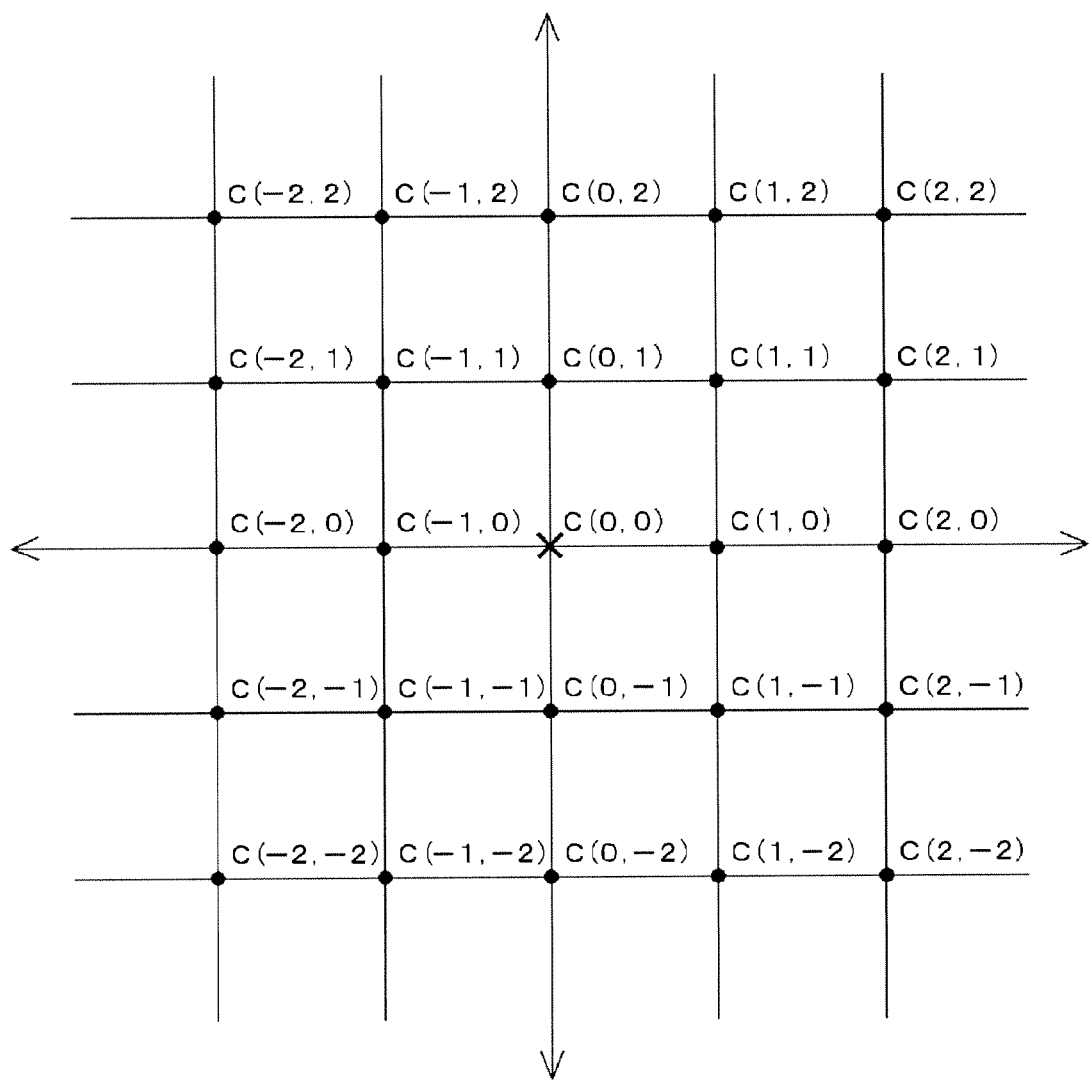
FIG. 4 is a view illustrating the rules for identifying respective characteristic points in calibration patterns.

FIG. 4 illustrates rules for identifying the characteristic points in the respective marks M in the calibration plate 30.

The figure illustrates the arrangement of the respective marks M, by substituting, therefor, the arrangement of the respective center points, and by assigning a label of C(i, j) to each center point. The values of the respective labels (i, j) are set, such that they are varied one by one, along the arrangement of the points, assuming that the center point of the center mark M0 is (0, 0).

In the present embodiment, in the calibration processing, at first, the calibration plate 30 is brought into a state where its surface is horizontal, and the respective cameras A, B and C are caused to perform an image pickup. Next, while maintaining the calibration plate 30 at the horizontal state, the height thereof is changed, and the respective cameras A, B and C are caused to perform an image pickup, again. More specifically, the first image pickup is performed while the calibration plate 30 is installed on the transfer line being stopped or on a flat surface outside the line, and, next, the second image pickup is performed while a dedicated supporting table is placed on this installation surface and the plate 30 is installed on this supporting table.

Figure 5:
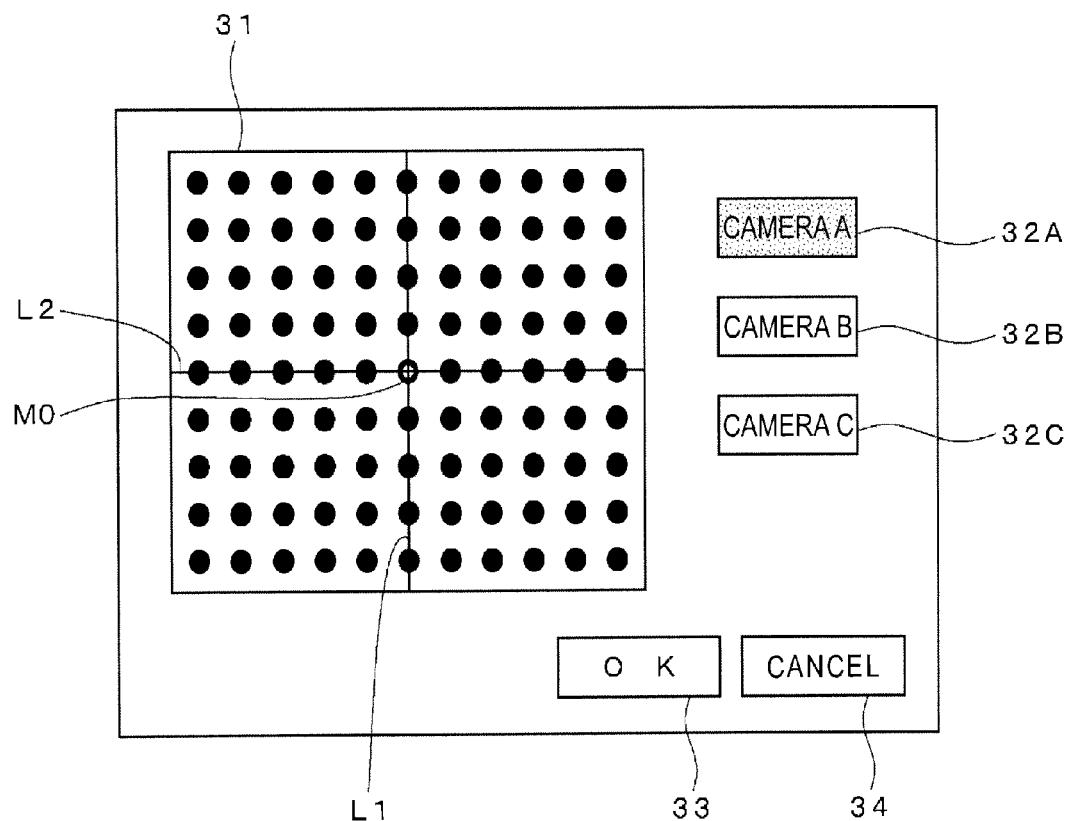
FIG. 5 is a view illustrating an example of a screen displayed during an image pickup for the calibration plate.

Further, in the present embodiment, during the aforementioned operations, the display portion 25 is caused to display a screen as illustrated in FIG. 5, in order to facilitate the operations for adjusting the positional relationship between the calibration plate 30 and the cameras A, B and C. In this screen, there are provided an image display area 31, selection buttons 32A, 32B and 32C for specifying an image to be displayed in this area (corresponding to the cameras A, B and C), an OK button 33, a cancel button 34 and the like. Further, in the image display area 31, there are displayed a line L1 along the vertical direction and a line L2 along the horizontal direction, such that the lines pass through the center position in the area 31. Regardless of the variation of the image being displayed in the area 31, these lines L1 and L2 are displayed invariably by being superimposed on the image.

During the first image pickup, a user adjusts the position and the attitude of the calibration plate 30, based on the display of an image through the camera A for front-viewing, such that the center mark M0 is positioned substantially at the center of the field of view of the camera A and, also, the arrangements of marks, including the mark M0, in the longitudinal and lateral directions are substantially coincident with the lines L1 and L2. However, since the intervals between adjacent marks M are constant, it is also possible to interchange the correspondences of the longitudinal and lateral directions of the plate 30 with the lines L1 and L2. Further, provided that angles between the arrangements of the marks and the lines L1 and L2 are less than 45 degrees, it is also possible to place the plate 30 such that the lines L1 and L2 are oblique with respect to the longitudinal and lateral arrangements of the marks M.

For the cameras B and C, similarly, the user verifies that a sufficient number of marks M including the mark M0 is included in the image display area 31. If there is inadequacy, the user adjusts the positions of the cameras B and C and orientations of their optical axes. After completing these verifications and adjustments, the user operates the OK button 33 for generating a command for starting an image pickup.

In the second image pickup, similarly, the calibration plate 30 is placed in the fields of view of the respective cameras A, B and C, with the same procedures, and it is necessary that the positions of the cameras A, B and C and the orientations of their optical axes are maintained at the same state as that in the first image pickup.

Figure 6:
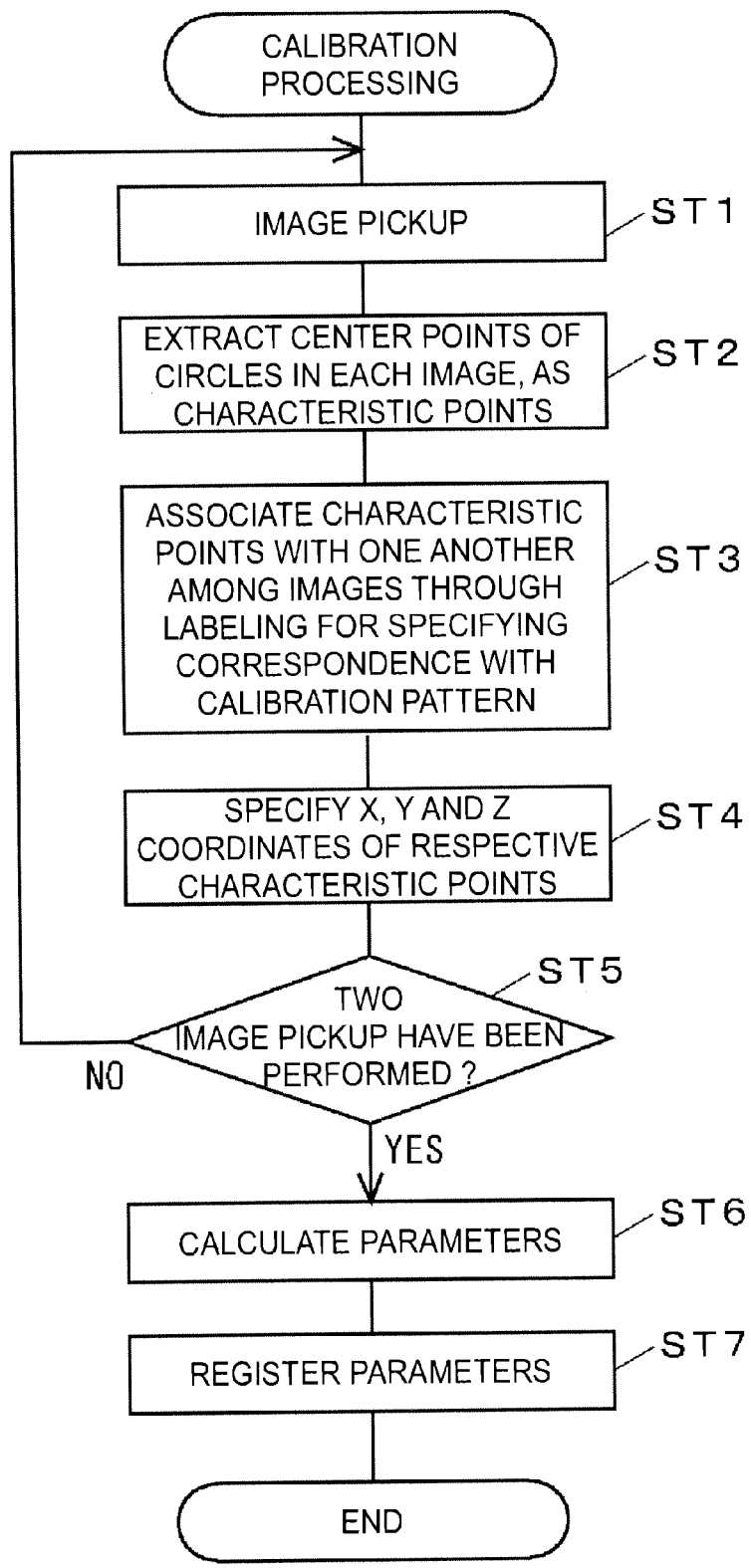
FIG. 6 is a flow chart illustrating processing procedures during calibration.

FIG. 6 illustrates a series of procedures for calibration processing. Hereinafter, with reference to FIG. 6 and other figures as required, the calibration processing will be described in detail.

In this processing, at first, a first image pickup is performed in the manner described above (ST1). Next, circles indicating marks M are extracted from the respective images created by the cameras A, B and C, and the center points of these circles are extracted as characteristic points of the respective marks M (ST2).

In the next step ST3, the characteristic points in the respective images are labeled, in order to determine the correspondence among the characteristic points in the respective images and the correspondence between the respective characteristic points and the actual marks M. More specifically, at first, the mark M0 is recognized based on its external characteristics, and a label of C(0, 0) is assigned to the characteristic point thereof. Next, search ranges with a predetermined angular width are defined in the upward, downward, leftward and rightward directions from this reference point C(0, 0), and a characteristic point at a position closest to the reference point C(0, 0) is extracted from each of these ranges. Then, based on the directions in which the extracted characteristic points are arranged with the reference point C(0, 0) sandwiched therebetween, the upward, downward, leftward and rightward directions of the arrangement of the characteristic points are determined. Further, the positional relationships of the other characteristic points with the reference point C(0, 0) are derived based on the respective directions of the arrangement, and the rules for labeling illustrated in FIG. 4 are applied to the respective positional relationships to determine the labels C(i, j) for the respective characteristic points.

In the present embodiment, the cameras A, B and C are laterally arranged, which prevents occurrence of a difference of 90 degrees or more in a direction of arrangement of marks M, among the respective images. This enables assigning the same label to characteristic points in the respective images which have a correspondence thereamong. Accordingly, for each set of characteristic points having the same label, a mark M corresponding to this set, out of the actual calibration patterns, is uniquely identified.

Next, in step ST4, X, Y and Z coordinates of each characteristic point are determined, using the front-view image created by the camera A.

In the present embodiment, a world coordinate system is defined, using the fact that the calibration plate 30 is installed on a horizontal surface, such that a plane including the respective characteristic points determined through the first image pickup is a plane having a height (Z coordinate) of zero. More specifically, assuming that the actual position of the reference point C (0, 0) determined from the mark M0 is an origin point (0, 0, 0), the world coordinate system is defined, such that the leftward and rightward arrangement passing through the reference point C(0, 0) is coincident with the direction of the X axis, and the upward and downward arrangement passing through the reference point C(0, 0) is coincident with the direction of the Y axis. Hereinafter, such a plane having a height of zero will be referred to as a "reference plane".

With the aforementioned settings, in the first image pickup, the respective characteristic points are arranged along the X axis and the Y axis in the world coordinate system. Accordingly, among the three-dimensional coordinates of each characteristic point C (i, j) determined through the first image pickup, the X coordinate ($X_{ij}$) and the Y coordinate ($Y_{ij}$) can be determined by the following calculations using the distance D between the center points of adjacent marks M out of the calibration patterns.

$$X_{ij}=I*D, Y_{ij}=j*D$$

Further, the Z coordinate ($Z_{ij}$) of each characteristic point is all set to zero.

Next, for the second image pickup, the processing for extracting the characteristic points for the marks M (ST2) and the labeling (ST3) are performed, and thereafter, the X, Y and Z coordinates of the respective characteristic points C(i, j) are determined (ST4) in the same way as in the first image pickup. In this case, at first, the front-view image resulted from the current image pickup is compared with the front-view image resulted from the first image pickup to determine an amount of positional deviation of the reference point C(0, 0) in the image and, also, to determine an amount of rotational deviation with respect to the first image pickup in the upward, downward, leftward and rightward directions of the arrangements of the marks. Further, for each set of characteristic points associated with one another with labels among the cameras A, B and C, the X and Y coordinates are determined in the same way as in the first image pickup and, thereafter, these coordinates are corrected with the aforementioned amounts of positional deviation and rotational deviation. On the other hand, as the Z coordinate ($Z_{ij}$), the value of the changed height of the calibration plate 30 plus the thickness of the calibration plate is employed.

Thus, a plurality of characteristic points are extracted from each of six images created by the two image pickups using the respective cameras, and the three dimensional coordinates corresponding to the respective characteristic points are determined.

Thereafter, for each camera, the three-dimensional coordinates of the respective characteristic points are associated with the corresponding two-dimensional coordinates in the images and, further, these sets of coordinates are substituted into the aforementioned calculation equation for perspective projection transformation (Equation (1)) to determine a perspective projection matrix P through a least-square method (ST6). These matrices P determined for the respective cameras become parameters for three-dimensional measurement. The calculated parameters are then registered in a memory (ST7), and the processing ends.

By registering the parameters as described above, thereafter, it is possible to perform three-dimensional measurement for works W. However, the present embodiment aims at determining the heights of the buttons with respect to the upper surfaces of the cabinets of works W and, therefore, it is desirable that the height of the upper surfaces of the cabinets is zero. However, the reference plane defined through calibration is not appropriate for this purpose.

Therefore, in the present embodiment, after the completion of the calibration processing, an actual-product model (hereinafter, referred to as a "work model WM") for a work M is installed on the transfer line being stopped, and processing for changing the parameters for three-dimensional measurement is performed, such that the Z coordinate is zero in cases where the cabinet upper surface is measured. That is, the reference plane (the plane with a height of zero) is updated by changing the parameters.

More specifically, in the present embodiment, marks having a predetermined shape are provided at three or more positions in a plane which forms the updated reference plane, images of these marks are captured through the stereo camera 1, and three dimensional measurement is performed thereon to derive an equation specifically expressing this plane. Further, based on the relationship between the plane expressed by this equation and the reference plane defined through the calibration, the perspective transformation matrices P registered as parameters through the calibration are changed, and the registered parameters are replaced with the changed perspective transformation matrices.

Figure 7:
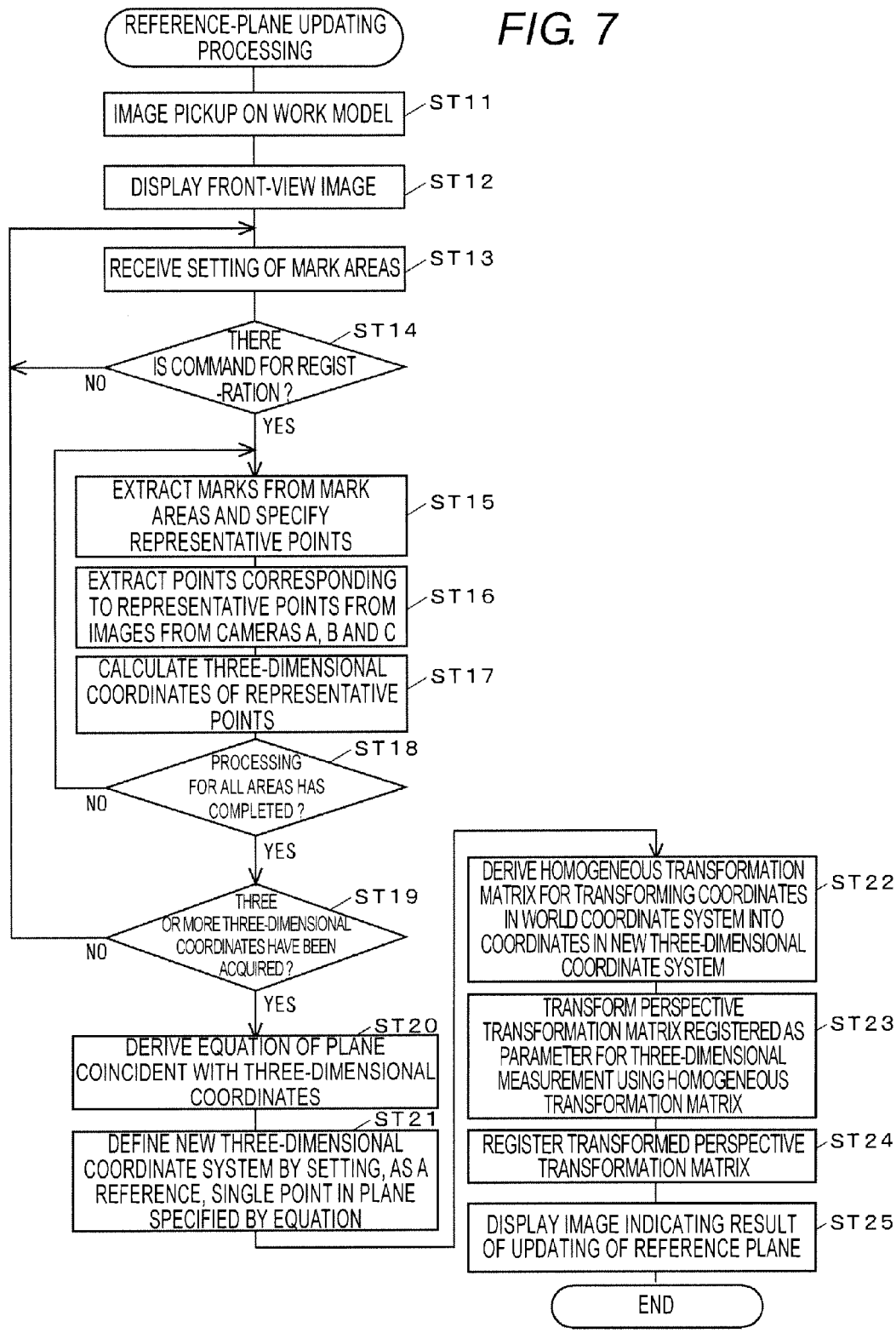
FIG. 7 is a flow chart illustrating procedures of processing for updating a reference plane.

Hereinafter, with reference to a flow chart in FIG. 7 and FIG. 8, the processing for updating the reference plane will be described in detail. At first, through a screen similar to that in FIG. 5, the user verifies that the work model WM properly falls within the fields of view of the respective cameras A, B and C and, then, generates a command for starting an image pickup. This causes the start of the processing illustrated in the flow chart of FIG. 7, thereby causing the respective cameras A, B and C to perform an image pickup on the work model (ST11).

Figure 8:
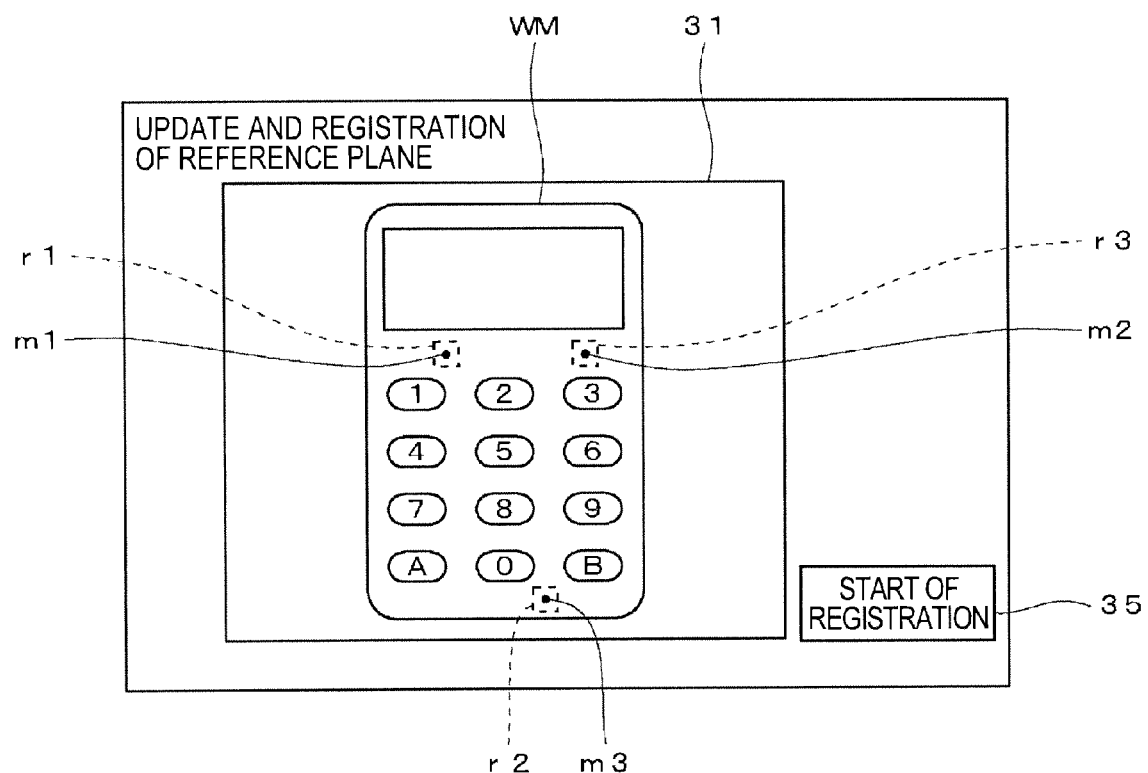
FIG. 8 is a view illustrating an example of a screen displayed during the processing for updating the reference plane.

After the completion of the image pickup, the screen in the display portion 25 is changed to a screen illustrated in FIG. 8. This screen is also provided with the image display area 31, which displays therein a front-view image of the work model WM. Further, "m1", "m2" and "m3" in the image indicate marks provided on the work model through attachment of circular-shaped seals thereto.

In the present embodiment, the user is caused to specify, in the aforementioned displayed image, areas that include the respective marks m1, m2 and m3. In FIG. 8, dotted-line frames r1, r2 and r3 indicate areas specified by this operation. Hereinafter, these areas will be referred to as "mark areas".

Beside the image display area 31, there is provided a button 35 for generating a command for starting registration. The user can operate the button 35, after setting an arbitrary number of mark areas in the image display area 31.

Returning to FIG. 7, a front-view image of the work model WM is displayed as described above (ST12), and the setting of mark areas and an operation on the registration start button 35 are received, ST14 results in "YES". Hereinafter, respective steps ST15, ST16 and ST17 will be executed, by focusing attention on the set mark areas in order.

In ST15, the mark is extracted from the mark area on which attention is being focused and, further, the center point thereof is defined as a representative point. In the present embodiment, the marks attached to the work model WM have the same color and the same diameter, which enables easily extracting the marks through pattern matching or other methods in ST15, provided that the user has correctly defined the mark areas.

In ST16, based on the parameters registered through the calibration processing, epipolar lines coincident with the representative point extracted in ST15 are defined, in the images from the cameras B and C, and points corresponding to the representative point are searched for along these lines. Thus, the coordinates of the representative point in the respective images are determined and, then, in ST17, the three-dimensional coordinates of the representative point are calculated using the coordinates.

After the above steps ST15, ST16 and ST17 have been executed for all the specified areas, if the number of the calculated three-dimensional coordinates is less than 3, the processing again returns to the processing for receiving the setting of mark areas (ST13). On the other hand, when three or more three-dimensional coordinates have been obtained, ST18 and ST19 both result in "YES", and the processing proceeds to ST20.

In ST20, an equation expressing a plane coincident with these coordinates is derived, using the obtained three-dimensional coordinates. Next, in ST21, a new three-dimensional coordinate system is defined, by using, as a reference, a single point in the plane identified by the above equation. More specifically, a direction perpendicular to the plane is defined as a Z axis, and two directions orthogonal to each other in the plane are defined as an X axis and a Y axis, by setting, as an origin point, one of the three-dimensional coordinates used for deriving the equation of the plane or a barycentric point of a polygonal shape defined by these three-dimensional coordinates.

Next, in ST22, the amount of displacement of the origin point of the new three-dimensional coordinate system, and the rotational angle thereof about the X, Y and Z axes, with respect to the world coordinate system defined through the calibration, are calculated. Then, using the calculated amount of displacement and the calculated rotational angle, a homogeneous transformation matrix T (the following equation (3)) necessary for processing for transforming coordinates in the world coordinate system into coordinates in the new three-dimensional coordinate system is derived.

(Equation 3)

$$T = \begin{bmatrix} T_{00} & T_{01} & T_{02} & T_{03} \\ T_{10} & T_{11} & T_{12} & T_{13} \\ T_{20} & T_{21} & T_{22} & T_{23} \\ 0 & 0 & 0 & 1 \end{bmatrix} \quad (3)$$

Further, in ST23, a calculation (the following equation (4)) for transforming the perspective transformation matrices P registered as parameters for three-dimensional measurement is performed, using the above matrix T.

(Equation 4)

$$P' = P \cdot T = \begin{bmatrix} P_{00} & P_{01} & P_{02} & P_{03} \\ P_{10} & P_{11} & P_{12} & P_{13} \\ P_{20} & P_{21} & P_{22} & P_{23} \end{bmatrix} \begin{bmatrix} T_{00} & T_{01} & T_{02} & T_{03} \\ T_{10} & T_{11} & T_{12} & T_{13} \\ T_{20} & T_{21} & T_{22} & T_{23} \\ 0 & 0 & 0 & 1 \end{bmatrix} \quad (4)$$

With the homogeneous transformation matrix T, the respective three-dimensional coordinates calculated in ST17 are expressed as points in a plane having a height of zero in the new three-dimensional coordinate system. Accordingly, matrix P' resulted from the transformation corresponds to a perspective transformation matrix for use in performing three-dimensional measurement, assuming that the plane including these three-dimensional coordinates has a height of zero.

In ST24, this perspective transformation matrix P' is registered as a parameter for use in three dimensional measurement. This makes it possible to calculate Z coordinates, assuming that the surface of the work model W which is provided with the marks m1, m2 and m3 has a height of zero.

Further, in the present embodiment, an image indicative of the result of updating of the reference plane is displayed (ST25) and, thereafter, the processing for updating the reference plane ends. This enables the user to check the updated reference plane, and then proceed to the actual processing.

Figure 9A:
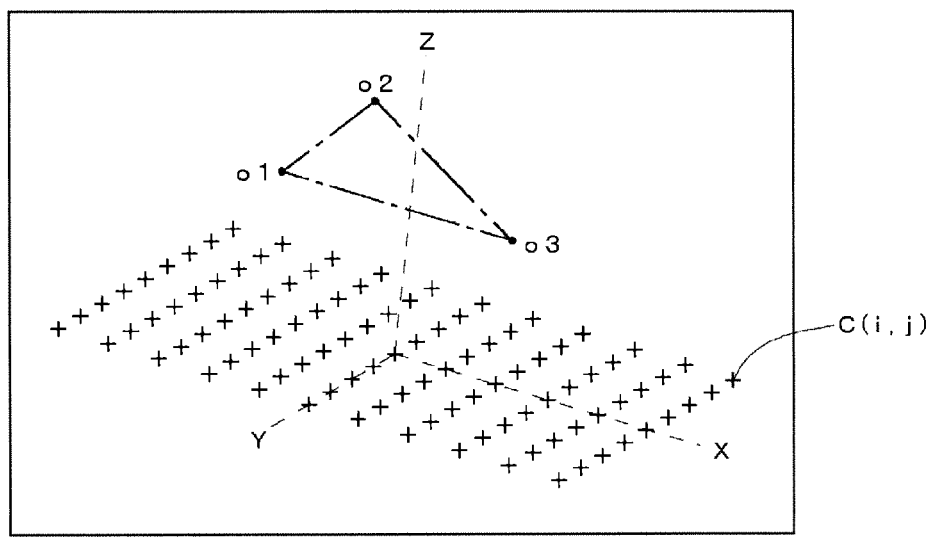
FIGS. 9A and 9B are views illustrating an example of display indicating, as projected images, a relationship between un-updated reference plane and updated reference plane.
Figure 9B:
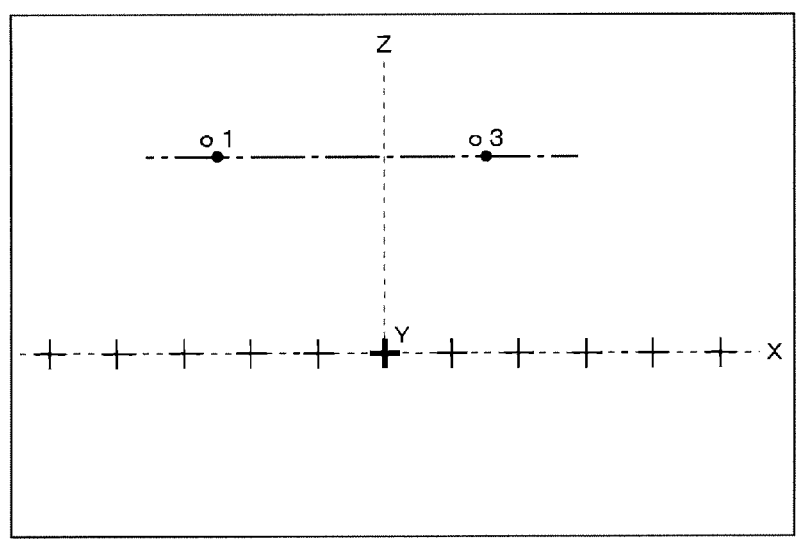

FIGS. 9A and 9B illustrate a specific example of an image display screen which displays the result of updating of the reference plane. This image is created by performing a perspective transformation of the three-dimensional coordinates of the respective characteristic points C(i, j) in the reference plane defined through calibration (that is, the reference plane which has not been updated) and on the three-dimensional coordinates of the representative points o1, o2 and o3 extracted from the marks m1, m2 and m3 through the processing for updating the reference plane. The three-dimensional coordinates of these respective points are determined based on the definition of the calibration, and lines indicative of the X, Y and Z axes (illustrated as dotted lines in the figure) based on the definition are also displayed.

Further, the respective characteristic points C(i, j) in the un-updated reference plane and the representative points o1, o2 and o3 in the updated reference plane are expressed by different colors (illustrated by distinguishing with + marks and − marks in the figure). Further, the updated reference plane is expressed by lines connecting the representative points o1, o2 and o3 to one another (illustrated by dashed lines in the figure).

FIG. 9A illustrates an image created by performing a perspective transformation of each reference plane in an oblique upward direction, and FIG. 9B illustrates an example created by performing a perspective transformation of each reference plane in the direction along the Y axis direction.

In the present embodiment, the point of view and the direction of projection in perspective transformation processing are changed according to operations by the user, which enables checking the relationship between the un-updated and updated respective reference planes, in various directions, as illustrated in FIGS. 9A and 9B. Accordingly, if the updated reference plane is determined to be improper from this display, it is possible to execute processing for updating the reference plane again, which enables ensuring accuracy in actual measurement.

Further, while, in the aforementioned embodiment, a front-view image of the work model WM is displayed for causing the user to specify areas including the respective marks m1, m2 and m3, the present invention is not limited thereto, and the respective marks m1, m2 and m3 can be automatically extracted from a front-view image, and specification of representative points and search for the corresponding points in other images can be subsequently performed. Further, in cases where the surface defined as the reference plane (the upper surfaces of the cabinets of works W in the present embodiment) includes characteristic patterns such as characters or symbols, it is also possible to cause the user to specify ranges including such characteristic patterns and to recognize, as marks, the characteristic patterns within the specified ranges.

Further, in the aforementioned embodiment, measurement is performed for certain portions of works W. However, even when measurement should be performed on entire works W, it is possible to attach predetermined marks at three or more positions on the supporting surface for the works W and to execute the same procedures as in FIG. 7 for defining the supporting surface as the reference plane. In this manner, it is possible to easily update the reference plane for stably performing measurement of the heights of respective portions, even when the works W are supported on a surface at a different height from that of the reference plane defined through calibration processing or when the height of the supporting surface is changed due to changes of measurement conditions.

Further, when the supporting surface for the works W is horizontal, it is possible to perform processing for updating the reference plane, using the calibration plate 30 used for calibration. In this case, for the respective characteristic points extracted from the calibration patterns, the three-dimensional coordinates thereof in the world coordinate system are determined using the registered parameters and, also, the three-dimensional coordinates thereof in the new three-dimensional coordinate system are determined in the same way as for the first image pickup in the calibration processing, and a homogeneous transformation matrix T can be derived from the relationship between these coordinates.

Further, in this case, the thickness of the calibration plate 30 is added to measured values and, in cases where this thickness can be acceptable as an error, it is possible to perform three-dimensional measurement using the changed parameters. Further, even when accuracy of measurement is required, it is possible to cope therewith by correcting the Z coordinates based on the thickness of the calibration plate 30 after the measurement.

Further, it is not necessary that the updated reference plane is a horizontal plane and, therefore, even when the supporting surface for the works W is inclined with respect to a horizontal plane, it is possible to recognize, with high accuracy, the distances from the supporting surface to respective portions of the works W, assuming that the direction orthogonal to the inclined surface is the heightwise direction. Further, when portions of the surfaces of the works W which protrude from the inclined surface should be recognized, similarly, it is possible to perform measurement assuming that the degree of the protrusion from the inclined surface is the height.

Further, with the three-dimensional vision sensor 100, it is possible to easily update the reference plane. Therefore, by forming the stereo camera 1 as a unit for fixing the positional relationship among the cameras A, B and C, it is possible to enable a manufacturer to complete calibration before the shipment. Accordingly, it is possible to ensure accuracy of calibration which is the base of three-dimensional measurement and, also, it is possible to freely update the reference plane for the convenience for the user, thereby improving the convenience. Further, in this case, it is desirable to maintain the parameters based on the reference plane at the time of shipment, as reference data, in order to enable restoration to the setting state at the time of the shipment.

Further, in the aforementioned embodiment, the parameters for three-dimensional measurement are updated such that the measured value of the height of the updated reference plane is 0. However, when the updated reference plane is parallel with the un-updated reference plane, it is also possible to maintain the parameters at the original values and, instead, it is possible to register the height of the updated reference plane as a reference value and to use, as the result of measurement, the value resulted from the subtraction of the reference value from the Z coordinate determined using the parameters defined through calibration.

Figure 10:
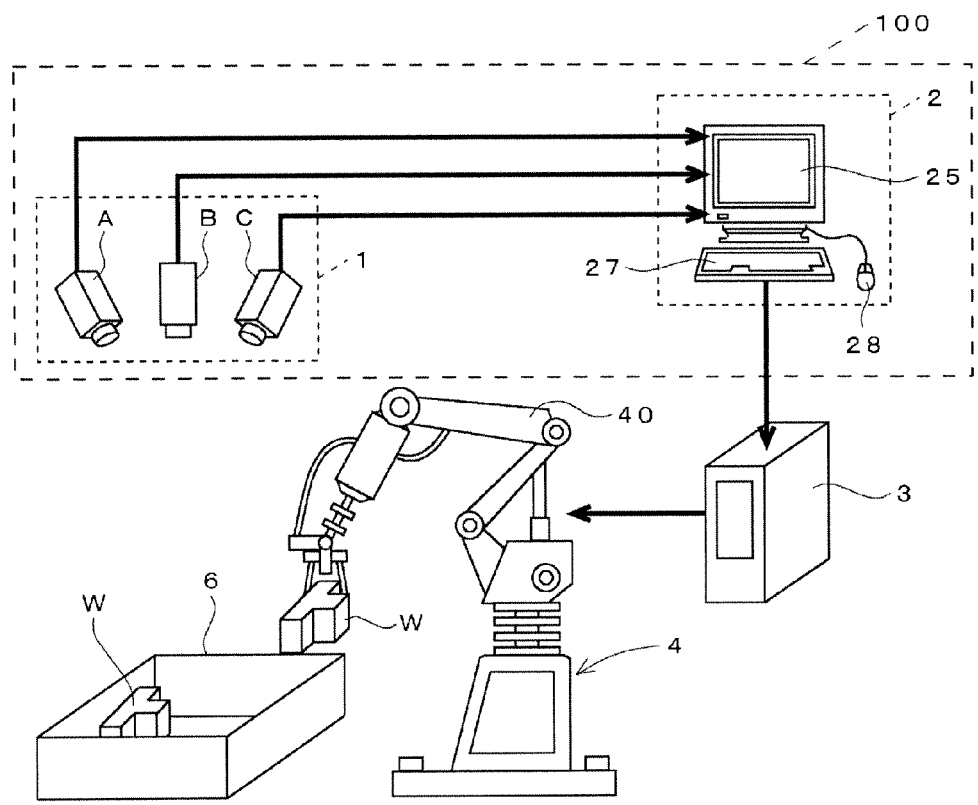
FIG. 10 is a view illustrating the structure of a picking system which incorporates a three-dimensional vision sensor.

FIG. 10 illustrates an example of a picking system which incorporates a three-dimensional vision sensor.

The picking system is adapted to perform operations for extracting, one by one, works W housed in a housing box 6 in a factory and transferring the works to a predetermined position. In addition to the three-dimensional vision sensor 100 for recognizing the works W, the picking system includes an articulated robot 4 for performing actual operations, and a robot control device 3 which controls the operations of the robot 4.

The three-dimensional vision sensor 100 is configured by a stereo camera 1 and a recognition processing apparatus 2 similar to those described in the first embodiment, and a three-dimensional model for a work W is registered in a memory 23 in the recognition processing apparatus 2 in the present embodiment. The recognition processing apparatus 2 incorporates, therein, images created by the respective cameras A, B and C and performs three-dimensional measurement for the contour line of each work W and, thereafter, compares three-dimensional information restored through these measurements with the registered three-dimensional model to recognize the position and the attitude of each work W. Three-dimensional coordinates indicative of the recognized position of the work W and the rotational angle of the work W with respect to the three-dimensional model (expressed for each of the X, Y and Z axes) are then outputted to the robot control device 3. The robot control device 3 controls the operations of an arm 40 in the robot 4 for causing the robot to grasp the work W.

The three-dimensional model for use in the aforementioned recognition processing is created by performing three-dimensional measurement on an actual-product model for a work W (hereinafter, referred to as a "work model WM"), using the cameras A, B and C after completing the calibration processing.

Figure 11:
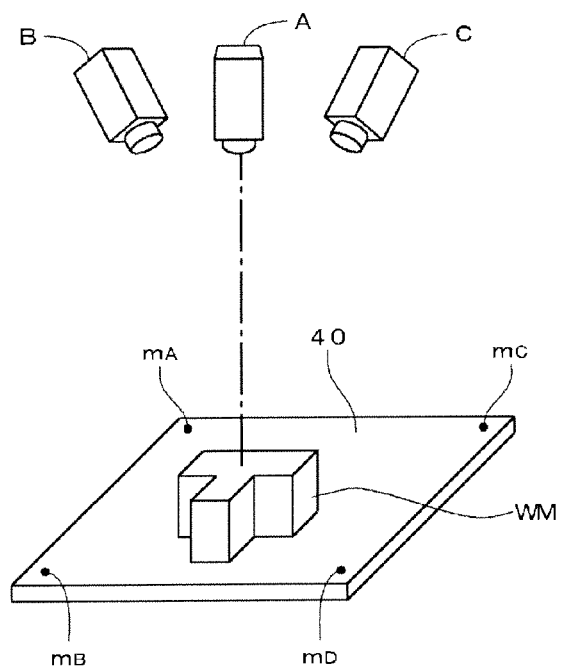
FIG. 11 is a view illustrating a method for performing an image pickup on a work model.

FIG. 11 illustrates a state where an image pickup is performed on the work model WM in model creating processing. In this example, the work model WM is installed on a flat supporting plate 40, and an image pick is performed thereon from thereabove. At the four corners of the supporting plate 40, there are provided marks $m_A$, $m_B$, $m_C$ and $m_D$ having a circular shape. These marks $m_A$, $m_B$, $m_C$ and $m_D$ can be provided by attachment of seals similarly to in the first embodiment, but the marks can also be provided by printing.

Hereinafter, processing for creating the three-dimensional model will be described.

In the present embodiment, for images created by the respective cameras A, B and C, edges of the respective images are detected, the detected edges are divided into units which are referred to as "segments" with respect to connection points and branch points, the extracted segments are associated with one another among the respective images, and the three-dimensional coordinates of a plurality of points in each segment are calculated. Hereinafter, this processing is referred to as "restoration of three-dimensional information".

Further, in the present embodiment, the attitude of the work model WM with respect to the stereo camera 1 is changed for setting a plurality of measurement directions, and the three-dimensional information restored for the respective measurement directions are integrated with each other for creating a three-dimensional model expressing the entire shape of a work W.

Figure 12:
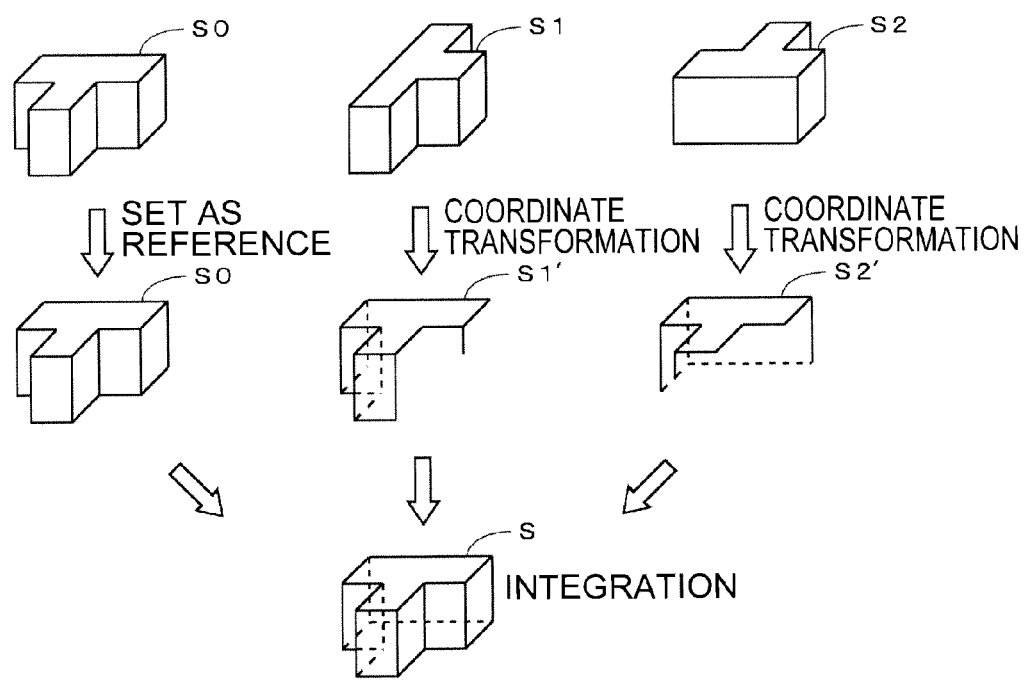
FIG. 12 is a view schematically illustrating a method for creating a three-dimensional model.

FIG. 12 schematically illustrates the processing for creating a three-dimensional mode. In the figure, S0, S1 and S2 indicate three-dimensional information restored by performing measurement on the work model WM in different directions. In the present embodiment, a coordinate transformation is performed, such that the three-dimensional information S0 among them is used as a reference, and the positions of the other three-dimensional information S1 and S2 are adjusted with respect to the reference three-dimensional information S0. Three-dimensional information S1' and S2' resulted from the transformation are then integrated with the reference three-dimensional information S0, and the integrated three-dimensional information S is registered as a three-dimensional model.

Further, in order to adjust the positions of the three-dimensional information S1 and S2 with respect to the reference three-dimensional information S0, characteristic points (in the present embodiment, the intersection points among segments are used as the characteristic points) in these three-dimensional information are associated with characteristic points in the reference three-dimensional information M0 in all possible manners, and a relationship which realizes best matching thereamong is employed for performing a coordinate transformation.

With the three-dimensional model determined according to the aforementioned method, it is necessary to set the height of the work model from the supporting surface as a Z coordinate. In consideration of this fact, in the present embodiment, as illustrated in FIG. 11, the work model WM is placed on the supporting plate 40, and processing for updating the reference plane is performed similarly to the first embodiment, using the marks $m_A$, $m_B$, $m_C$ and $m_D$ at the four corners of the plate 40. Thus, the parameters for three-dimensional measurement are changed such that measurement can be performed assuming that the height of the supporting surface 40 is zero, and, thereafter, measurement of the work model WM is performed.

Further, in the present second embodiment, the parameters changed through the aforementioned processing are used only for the processing for creating the three-dimensional model, and the parameters registered through the calibration processing are maintained as such. In order to recognize actual works W, the parameters registered through the calibration processing can be used as such or the parameters can be changed so that the supporting surface for the works W functions as the reference plane.

Figure 13:
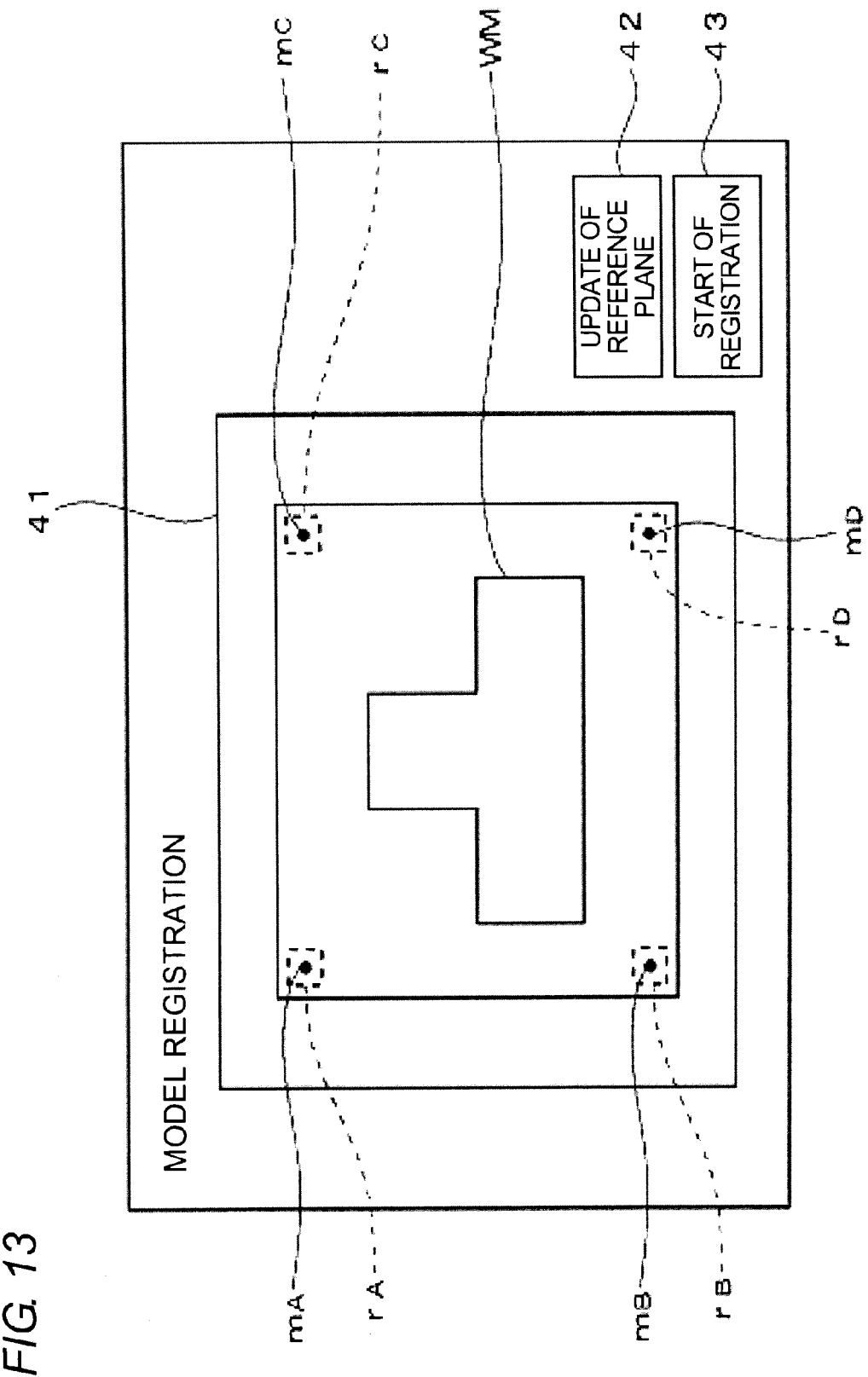
FIG. 13 is a view illustrating an example of a screen displayed during processing for registering a three-dimensional model.

FIG. 13 illustrates an example of a screen displayed on the display portion 25 during model registration processing. This screen is provided with an image display area 41 for displaying a front-view image from the camera A and, is also provided with a button 42 for generating a command for updating the reference plane, and a button 43 for supporting the start of model registration processing.

In the aforementioned screen, the user sets mark areas $r_A$, $r_B$, $r_C$ and $r_D$ so as to include the respective marks $m_A$, $m_B$, $m_C$ and $m_D$ according to a method similar to that in the first embodiment, in the image within the image display area 41. Then, the user operates the button 42, which causes the execution of the same procedures as those in ST13 to ST25 in FIG. 7. This makes it possible to perform measurement of heights with respect to a plane including these marks, based on the three-dimensional coordinates measured from the respective marks $m_A$, $m_B$, $m_C$ and $m_D$.

Figure 14:
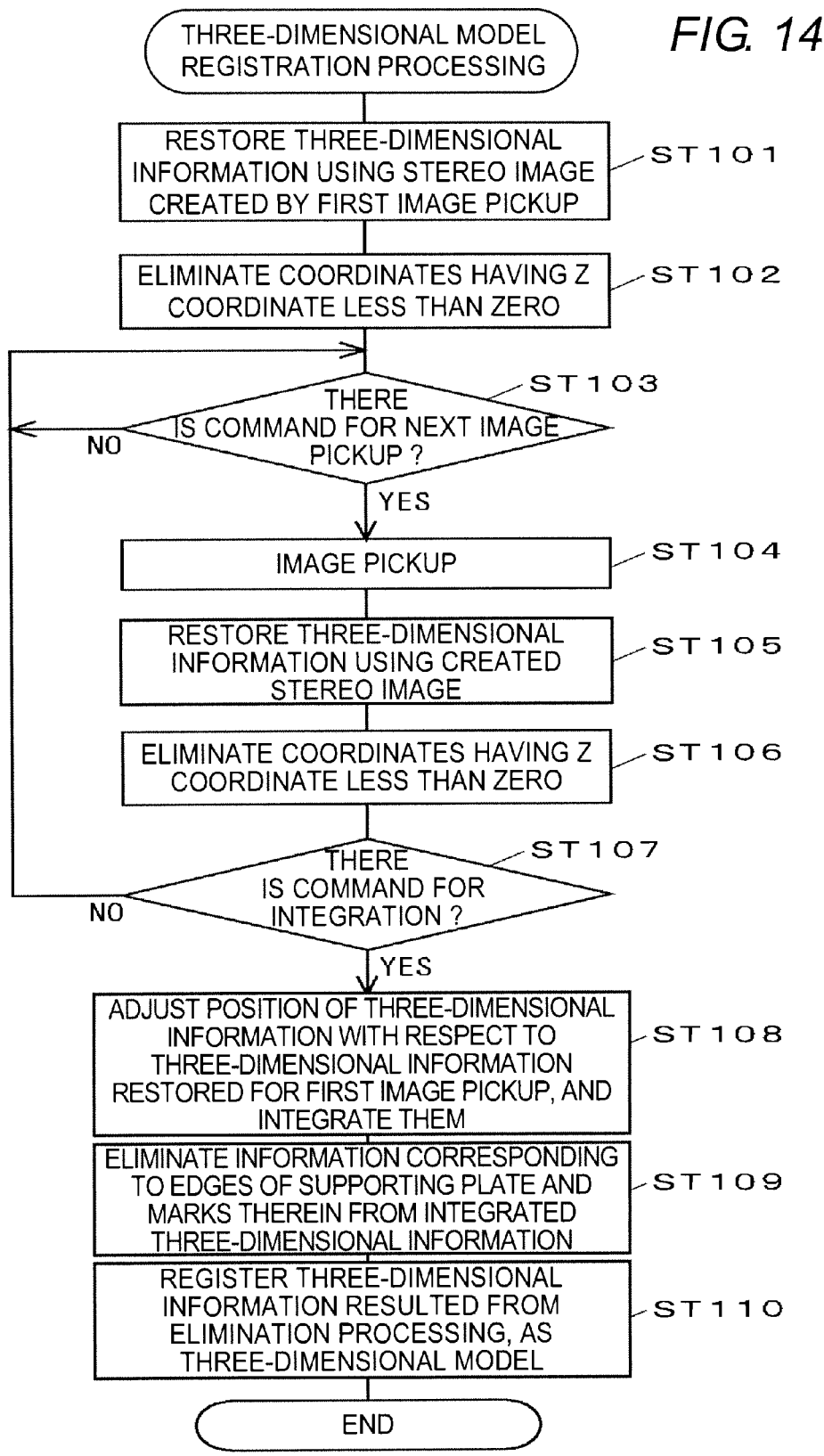
FIG. 14 is a flow chart illustrating schematic procedures of the processing for registering a three-dimensional model.

FIG. 14 schematically illustrates procedures of processing which is performed subsequently to updating the reference plane through the aforementioned processing. This processing is started, in response to an operation having been performed on the registration start button 43 illustrated in FIG. 13. At first, in this case, processing for restoring three-dimensional information is performed, using a stereo image created by a first image pickup, namely a stereo image used in the reference-plane updating processing (ST101).

Further, in the present embodiment, the coordinates each having a Z coordinate smaller than 0 are eliminated from the restored three-dimensional information (ST102).

Thereafter, if the user changes the attitude of the work model WM and generates a command for starting the next image pickup ("YES" in ST103), a second image pickup is performed, and the three-dimensional information is restored using the created stereo image (ST104 and ST105). Further, in this case, similarly, processing for eliminating the coordinates each having a Z coordinate smaller than 0 from the restored three-dimensional information is performed (ST106).

Hereinafter, similarly, the respective steps ST104, ST105 and ST106 are performed every time a command for image pickup is generated, until an operation for generating a command for integration of the three-dimensional information is performed.

If a command for integration is generated, ST107 results in "YES", and the processing proceeds to ST108. In ST108, the positions of the three-dimensional information restored at the second time and later are adjusted through a coordinate transformation, with respect to the three-dimensional information restored at first (that is, the three-dimensional information which was restored in ST101 and was thinned through the processing in ST102). Then, the resultant three-dimensional information is integrated.

Thereafter, the edges of the upper surface of the supporting plate and the marks $m_A$, $m_B$, $m_C$ and $m_D$ at the four corners thereof are eliminated from the integrated three-dimensional information (ST109), and the three-dimensional information resulted from the elimination processing is registered as a three-dimensional model (ST110). Further, the processing in ST109 can be automatically performed using preliminarily-registered information about the contours of the supporting plate 40 and the marks, but the processing is not limited thereto, and the integrated three-dimensional information can be displayed on the display portion for causing the user to eliminate the corresponding information through manual operations thereon.

With the aforementioned procedures, the parameters for three-dimensional measurement are updated such that the supporting surface for the work model WM functions as a plane with a height of 0, before the start of the processing for registering the three-dimensional model. This enables accurately determining the heights of respective portions of the work model WM. Further, with the processing in ST102 and ST106, it is possible to eliminate, from the integration processing, noises such as patterns and shadows (not illustrated) of the edges of the side surfaces and the bottom surface of the supporting plate and the surface on which the supporting plate is installed. Accordingly, after the integration of the three-dimensional information, it is necessary only to eliminate three-dimensional information having simple and known shapes (the edges of the upper surface of the supporting plate and the marks thereon). This enables creation of the three-dimensional model with excellent efficiency.

Further, the processing for eliminating the coordinates having Z coordinates smaller than 0 can be also applied to recognition of works in actual processing, as well as to the processing for creating a three-dimensional model. For example, in cases of performing three-dimensional recognition processing using the registered three-dimensional model, on components stacked at random on a supporting table having a predetermined height, it is possible to define the upper surface of this supporting table as a reference plane. In this case, even when an object other than the recognition-target object existing below the supporting table falls within the fields of view of the cameras A, B and C, it is possible to eliminate the object from the objects to be compared.

What is claimed is:

1. A three-dimensional vision sensor comprising a stereo camera;
   a parameter calculation unit which extracts a plurality of characteristic points in a calibration pattern which is designed to enable extracting, therefrom, a plurality of characteristic points having certain positional relationship relationships thereamong, from a stereo image created through an image pickup on the calibration pattern by the stereo camera, and further calculates a parameter for three-dimensional measurement using the extracted characteristic points;
   a parameter storage unit in which the parameter for three-dimensional measurement is registered;
   a model creation unit which performs three-dimensional measurement processing using the parameter registered in the parameter storage unit on a stereo image created through an image pickup on a predetermined recognition-target object by the stereo camera for creating a three-dimensional model for the recognition-target object using a result of the measurement;
   a three-dimensional-model storage unit in which the created three-dimensional model is registered; and
   a three-dimensional recognition unit which performs three-dimensional measurement processing using the parameter registered in the parameter storage unit on a stereo image created by an image pickup for the recognition-target object by the stereo camera and, further, compares the result of the measurement with the three-dimensional model registered in the three-dimensional-model storage unit for recognizing a position and an attitude of the recognition-target object, the three-dimensional vision sensor further comprising:
   a coordinate acquisition unit which, in response to an image pickup performed on a plane provided with predetermined characteristic patterns by the stereo camera, performs three-dimensional measurement processing for at least three representative points in the predetermined characteristic patterns, using a stereo image created by the image pickup performed on the plane and the parameter calculated by the parameter calculation unit, for acquiring three-dimensional coordinates of respective of the representative points, and
   a determination unit Which, based on the three-dimensional coordinates of respective of the representative points which have been acquired by the coordinate acquisition unit, specifies a calculation equation expressing a plane including the acquired three-dimensional coordinates and determines a positional relationship between the plane expressed by the calculation equation and a plane recognized as having a height of zero through three-dimensional measurement processing using the parameter calculated by the parameter calculation unit, and
   wherein the model creation unit corrects the parameter registered in the parameter storage unit based on the positional relationship determined by the determination unit, further performs three-dimensional measurement processing using the corrected parameter, and creates the three-dimensional model using the three-dimensional coordinates each indicating a height of 0 or more, out of the three-dimensional coordinates obtained from the three-dimensional measurement processing using the corrected parameter.

2. A three-dimensional model registration processing method for a three-dimensional vision sensor, the method comprising the steps of:
   performing, by a stereo camera, a first image pickup on a plane provided with predetermined characteristic patterns; restoring three-dimensional information using a first stereo image created by the first image pickup;
   eliminating image coordinates from the restored three-dimensional information created by the first image pickup having a z-coordinate less than zero;
   performing, by the stereo camera, a second image pickup; restoring three-dimensional information using a second stereo image created by the second image pickup;
   eliminating image coordinates from the restored three-dimensional information created by the second image pickup having a z-coordinate less than zero;
   determining whether there is a command for integration, and if so, performing the steps of:
   a) adjusting a position of three-dimensional information with respect to the restored three-dimensional information created by the first image pickup, based on integrating (i) the restored three-dimensional information created by the second image pickup with (ii) the restored three-dimensional information created by the second image pickup, as integrated three-dimensional information;
   b) eliminating information corresponding to edges of a supporting plate within the integrated three-dimensional information, as updated three-dimensional information; and
   c) registering, as a three-dimensional model, the updated three-dimensional information.

* * * * *